United States Patent Office 3,174,107
Patented Mar. 16, 1965

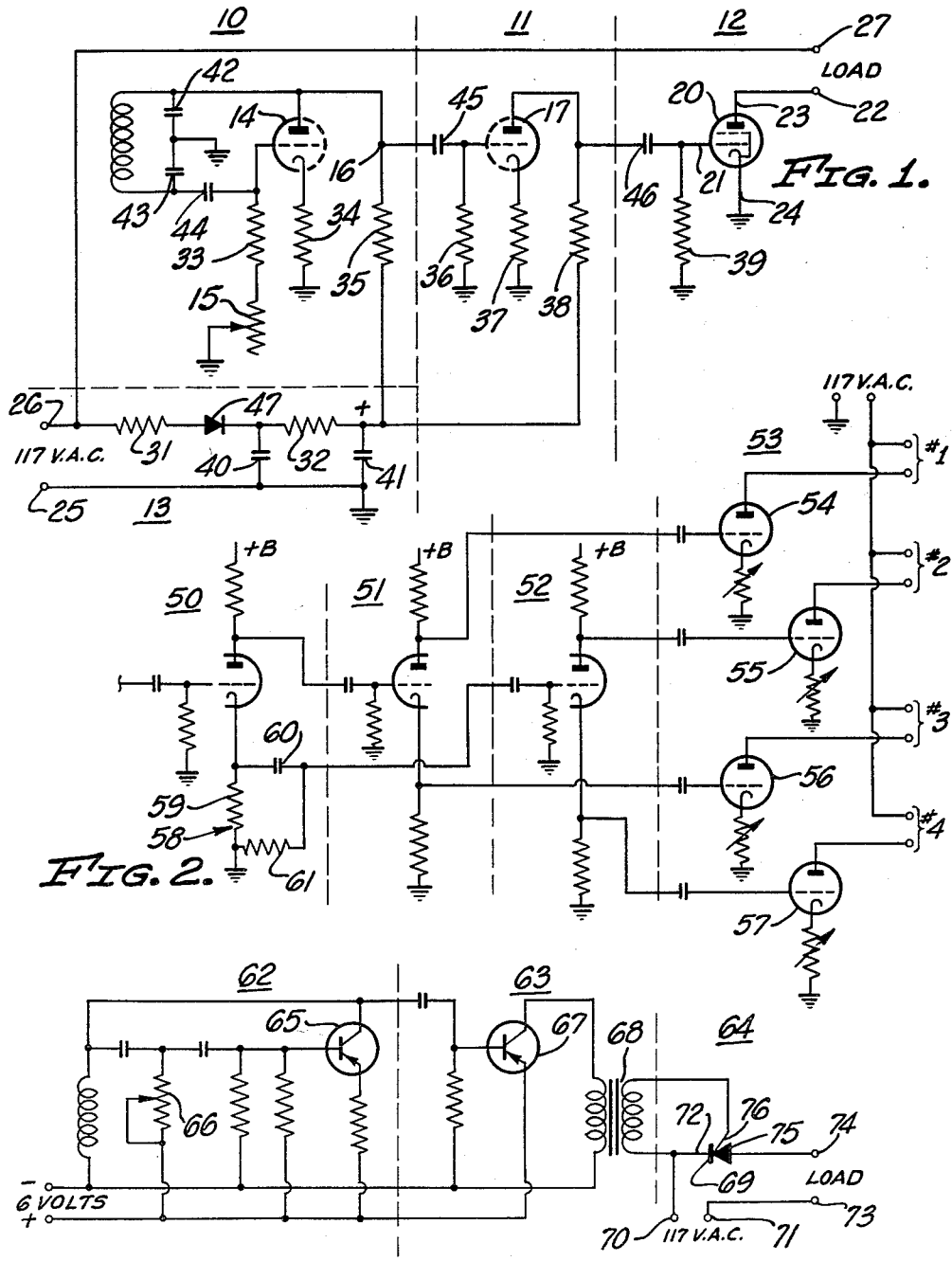

3,174,107
CONTROL CIRCUIT CYCLICALLY ENERGIZING A LOAD USING RAW A.C. AS ONE OF TWO SUPPLIES
Clifford E. Quackenbush, 317 W. Elk St., Glendale 4, Calif.
Filed Aug. 1, 1960, Ser. No. 46,515
4 Claims. (Cl. 328—70)

This invention relates to electrical control circuits and, in particular, to a control circuit for cyclically energizing a load. The control circuit of the invention is especially suitable for operating flashing neon signs, warning lights, traffic signals and the like but, of course, is not limited to these specific applications.

It is an object of the invention to provide a control circuit for cyclically energizing a load utilizing a conventional A.C. power source. A further object is to provide such a circuit wherein the load is energized at a rate which is relatively low compared to the frequency of the power source. A further object is to provide such a circuit wherein the operating rate of the load can be varied as desired. It is a specific object of the invention to provide such a control circuit having a high power output without requiring make and break contacts, relays, cams, motors or the like.

It is an object of the invention to provide a control circuit for cyclically operating two or more loads in sequence and at a relatively low operating rate. A particular object of the invention is to provide such a control circuit for operating chaser type electrical signs wherein the off or on portion of the sign continually moves around the sign giving the effect of motion.

It is an object of the invention to provide such a control circuit which is simple, inexpensive and reliable and which requires little or no maintenance during operation. A further object is to provide a control circuit for operation with an A.C. source to provide a controlled output to a load and including an oscillator having an A.C. output, a current control device having an anode electrode, a cathode electrode and a control element, circuit means for connecting the A.C. source in series with the load and the anode and cathode, and circuit means for connecting the oscillator output to the control element and one of the electrodes in controlling relation.

Other objects, advantages, features and results of the invention will more fully appear in the course of the following description. The drawing merely shows and the description merely describes preferred embodiments of the present invention which are given by way of illustration or example.

In the drawing:
FIG. 1 shows a preferred form of the control circuit utilizing electron tubes;
FIG. 2 shows a modification of the circuit of FIG. 1 for use with a four-lamp chaser; and
FIG. 3 shows a transistor version of the circuit of FIG. 1.

The circuit of FIG. 1 includes an oscillator section 10, an amplifier section 11, an output section 12, and a power supply section 13. The power supply section 13 is a conventional rectifier and filter stage operated from a 117 volt 60 cycle source to provide the D.C. power for the oscillator and amplifier. The oscillator section 10 utilizes a triode vacuum tube 14 in a Colpitts oscillator circuit which preferably is operable in the range of 50 to 60 cycles per second. A potentiometer 15 is connected in the grid circuit as a variable resistance to provide control of the frequency of the oscillator output.

The oscillator output appearing at point 16 is coupled to the grid of another triode 17 connected in a conventional voltage amplification circuit to provide the driving voltage for the output section 12. The amplification section 11 also provides isolation between the oscillator and output sections. The amplification section is not essential to the circuit of the invention and in many applications, the oscillator output may be connected directly to the output section.

The output section 12 includes a current control device, shown here as a thyratron-type rectifier tube 20. The output from the amplifier section 11 is connected to the control grid 21, a load terminal 22 is connected to the anode 23 and the cathode 24 is connected to circuit ground. One terminal 25 of the A.C. source is connected to circuit ground and the other terminal 26 of the A.C. source is connected to the other load terminal 27 placing the load in series with the anode and cathode of the thyratron. In a typical application of the circuit, the load terminals 22, 27 will be connected directly to the primary winding of the voltage stepup transformer of a neon sign. For operating a flashing warning light or a traffic signal, the load terminals will be directly connected to the lamps thereof.

With the circuit of FIG. 1 connected to a 60 cycle per second power source and the oscillator set to provide a 58 cycle per second output, the load will be cyclically energized at a rate of 2 cycles per second. The operating rate of the load can be adjusted by varying the oscillator frequency via the resistance 15. This circuit provides the necessary power for operating flashing electric signs and similar cyclically energized devices without requiring timing motors, relays or other mechanical motions. For applications which require precise control of the operating cycle, a conventional stabilized oscillator circuit can be utilized. For most electric sign applications, the uncompensated circuit of section 10 is completely satisfactory.

The values for the components of one specific embodiment of the circuit of FIG. 1 are set out in Table I.

Table I

| | |
|---|---|
| 15 | 100K ohms |
| 31 | 10 ohms |
| 32 | 1000 ohms |
| 33 | 40K ohms |
| 34 | 700 ohms |
| 35 | 5000 ohms |
| 36 | 400K ohms |
| 37 | 700 ohms |
| 38 | 5000 ohms |
| 39 | 2 megohms |
| 40 | 30 mfd. |
| 41 | 30 mfd. |
| 42 | 2 mfd. |
| 43 | 1 mfd. |
| 44 | 0.1 mfd. |
| 45 | 0.2 mfd. |
| 46 | 0.2 mfd. |
| 47 | 65 ma. rectifier |
| 14, 17 | 6SN7 |
| 20 | 6012 |

An alternative form of the circuit of FIG. 1 suitable for operating four loads in sequence is shown in FIG. 2. In a typical application of this circuit, a round electrical sign would be divided into four quadrants with the lamps of each quadrant energized from a different pair of the load terminals indicated as Nos. 1, 2, 3 and 4 in the drawing. The circuit of FIG. 2 includes three phase inverter sections 50, 51, 52 and an output section 53. The phase inverter sections are conventional in design, each including a triode vacuum tube with a plate resistor and a cathode resistor. The input to the first section 50 is provided by an oscillator, such as that shown in FIG. 1, and is coupled to the control grid of the tube. One output from the phase inverter 50 is connected as in the input to the phase inverter 51. The two outputs from the phase inverter 51 are connected to the control grids of the thyratron tubes 54, 56, respectively. The other output from the phase inverter 50 is connected as the input to the phase inverter 52 through a phase shift circuit 58. The two outputs of the inverter 52 are connected to the control grids of the thyratron tube 55, 57, respectively.

The phase shift circuit 58 includes the cathode resistor 59 of the phase inverter, a serially connected capacitor 60, and a shunt connected resistor 61. The values of these components are selected to provide a 90° phase shift in the signal. The two outputs of the inverter 51 are 180° out of phase wtih each other. Similarly, the two outputs of the inverter 52 are 180° out of phase with each other. Because of the 90° phase shift introduced between the inverter 50 and the inverter 52, the oututs of the inverter 52 are 90° out of phase with the outputs of the inverter 51. Hence, each of the four loads is energized cyclically at the same rate but 90° out of phase with the adjacent loads. A variable resistance is provided in the cathode circuit of each of the rectifier tubes 54–57 to provide a control for the relative on and off times of the tube. Ordinarily, the circuit will be operated with each tube conducting for about three-fourths of a cycle and nonconducting for about one-fourth of a cycle. This will provide a lighted electrical sign in which a dark portion continually moves around the sign.

Various modifications of this circuit can be utilized to provide various effects. The circuit may be used for alternately energizing two loads by omitting the inverter section 52 and the rectifier units 55, 57. An eight-load chaser can be produced by adding two additional inverters and four additional rectifier units with the inputs to the inverters shifted 45° from the inputs to the inverters 51, 52, respectively.

An alternative form of the circuit of FIG. 1 utilizing solid state components is shown in FIG. 3. The circuit includes an oscillator section 62, an amplifier section 63, and an output section 64, which function in the same manner as the corresponding sections in the circuit of FIG. 1. The oscillator section includes a 2N241A transistor 65 and a variable resistance 66 for controlling the frequency of the output. The amplification section includes another 2N241A transistor 67 and an output transformer 68 for impedance matching to a C–35B controlled silicon rectifier 69 which serves as the current control device. A.C. source terminals 70, 71 are connected to the cathode 72 and the load terminal 73, respectively. The other load terminal 74 is connected to the anode 75 while the secondary of the transformer 68 is connected across the cathode 72 and the control element 76.

The operation of the circuit of FIG. 3 is identical to that of the circuit of FIG. 1. A two-load circuit may be obtained by using a center tap on the output winding of the transformer 68 and driving two rectifiers out of phase from the two halves of the output winding. Here the transformer functions as a phase inverter. A four-load circuit may be produced by utilizing a second output transformer with the input thereto 90° out of phase with the input to the first transformer.

In the control circuit as described above, the output current through the load is pulsating D.C. in form. When desired, a substantially sinusoidal wave can be obtained by operating two current control devices in parallel and in phase opposition. For example, in the circuit of FIG. 3, an additional secondary winding may be utilized on the transformer 68 to drive a second rectifier with the polarity reversed relative to the rectifier 69.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a circuit for sequentially flashing a plurality of lamps at a rate that is low with respect to that of a power line source, the combination of:
   an oscillator having an A.C. output in the frequency range of but differing from the frequency of the power line source;
   a phase inverter having a single input and two outputs out of phase with each other, with said oscillator output coupled to said phase inverter input;
   first and second rectifier units, each having an anode electrode, a cathode electrode, and a control element for initiating conduction between said electrodes;
   first circuit means for connecting the power line source in series with one of the lamp loads and the anode and cathode of said first rectifier unit;
   second circuit means for connecting the power line source in series with another of the lamp loads and the anode and cathode of said second rectifier unit;
   third circuit means for connecting one of said inverter outputs to the control element and one of the electrodes of said first rectifier unit in controlling relation; and
   fourth circuit means for connecting the other of said inverter outputs to the control element and one of the electrodes of said second rectifier unit.

2. In a circuit for sequential flashing of four lamp loads at a rate that is low with respect to that of a power line source, the combination of:
   an oscillator having an output in the frequency range of but differing from the frequency of the power line source;
   first, second and third phase inverters, each having a single input and two outputs out of phase with each other, with said oscillator output coupled to said input of said first inverter;
   means for generating a 90° phase shift between said first inverter outputs and connecting said shifted outputs to said second and third inverter inputs respectively;
   four rectifier units, each having an anode electrode, a cathode electrode, and a control element for initiating conduction between said electrodes;
   circuit means for connecting the power line source to four series circuits in parallel, each of said series circuits including a lamp load and the anode and cathode of a rectifier unit; and
   circuit means for connecting each of said second and third inverter outputs to a rectifier control element respectively for sequential energization of the lamp loads.

3. A circuit as defined in claim 1 including a variable resistance in circuit with each of said rectifier units for controlling the conduction period of the rectifier unit and thereby the on period of the connected lamp load.

4. A circuit as defined in claim 2 including a variable resistance in circuit with each of said rectifier units for controlling the conduction period of the rectifier unit and thereby the on period of the connected lamp load.

(References on following page)

References Cited by the Examiner
UNITED STATES PATENTS

| | | | |
|---|---|---|---|
| 1,996,847 | 4/25 | Zimmerman et al. | 328—84 |
| 2,170,034 | 8/39 | Reerink et al. | 328—84 |
| 2,190,552 | 2/40 | Swart | 328—84 |
| 2,217,443 | 10/40 | Hermann | 328—84 |
| 2,324,773 | 7/43 | Goldstein | 328—88 |
| 2,463,073 | 3/49 | Webb | 331—137 |
| 2,522,139 | 9/50 | Schoenbaum | 328—134 |
| 2,686,261 | 8/54 | Toulon | 328—133 |
| 2,750,455 | 6/56 | Geisler | 328—84 |
| 2,920,240 | 1/60 | Machlem | 307—88.5 |
| 2,942,548 | 6/60 | Bushong | 331—75 |

ARTHUR GAUSS, *Primary Examiner.*

GEORGE N. WESTBY, JOHN W. HUCKERT,
*Examiners.*